US006385455B1

(12) United States Patent
St. Clair et al.

(10) Patent No.: US 6,385,455 B1
(45) Date of Patent: May 7, 2002

(54) METHOD AND SYSTEM IN A TRANSCEIVER FOR SELECTING A COMMUNICATION PARAMETER FOR COMMUNICATING WITH A CONCENTRATED SUBSCRIBER UNIT

(75) Inventors: Jon Quin St. Clair, Bedford, TX (US); William Daniel Willey, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/289,621

(22) Filed: Apr. 12, 1999

(51) Int. Cl.⁷ .................................................. H04Q 7/20
(52) U.S. Cl. ..................................................... 455/450
(58) Field of Search .................................. 455/450, 77

(56) References Cited

U.S. PATENT DOCUMENTS

| | | | |
|---|---|---|---|
| 4,430,755 A | * | 2/1984 | Nadir et al. |
| 4,485,486 A | * | 11/1984 | Webb et al. |
| 4,893,316 A | * | 1/1990 | Janc et al. |
| 5,544,223 A | | 8/1996 | Robbins et al. ................ 379/58 |

* cited by examiner

Primary Examiner—William Cumming
(74) Attorney, Agent, or Firm—Bruce Terry; Steven A. May

(57) ABSTRACT

In a method in a transceiver for selecting a communication parameter for communicating with a concentrated subscriber unit, wherein the concentrated subscriber unit includes a plurality of subscriber terminals, a subscriber terminal identification number of one of the subscriber terminals is determined. Next, N number of selected digits in the subscriber terminal identification number are set equal to predetermined values to produce a modified subscriber terminal identification number. the modified subscriber terminal identification number is then hashed using a hashing function to produce a communication parameter indicator. Finally the communication parameter is selected in response to the communication parameter indicator, wherein groups of subscriber terminal identification numbers having non-selected digits with the same value are hashed to produce the same communication parameter indicator. The communication parameter selected may be a carrier frequency used by the communications system.

12 Claims, 4 Drawing Sheets

—PRIOR ART—

METHOD AND SYSTEM IN A TRANSCEIVER FOR SELECTING A COMMUNICATION PARAMETER FOR COMMUNICATING WITH A CONCENTRATED SUBSCRIBER UNIT

FIELD OF THE INVENTION

The present invention is related in general to digital communication systems, and more particularly to a method and system for selecting a communications parameter for communicating with a concentrated subscriber unit having multiple subscriber terminals sharing a transceiver.

BACKGROUND OF THE INVENTION

In many communications systems, transceivers in an infrastructure system are designed to communicate with subscriber units distributed throughout a communications system service area. One example of such a communications system is a wireless cellular communications system, wherein the cellular infrastructure system provides communication services to subscriber units in various locations throughout the cellular system coverage area.

In some communications systems, selected subscriber units may be fixed in a particular location, rather than mobile and free to move about the coverage area. When a subscriber unit is fixed, and several subscriber units are used in the vicinity of that same location, an opportunity arises for subscriber units to share communications resources, such as sharing a transceiver in a wireless communications system.

With reference now to FIG. 1, there is depicted a communications system 20 wherein subscriber units 22–26 communicate with infrastructure 28. Infrastructure 28 may be coupled to the public switched telephone network (PSTN) 30 so that subscriber units 22–26 may communicate with others connected to PSTN 30. Within infrastructure 28, base station controller 32 may be coupled to base stations 34 and 36, wherein base station controller 32 provides base stations 34 and 36 with control and traffic data. If communications system 20 is a cellular communication system, supporting mobile subscriber units, base station controller 32 may be used to route communication traffic to a selected base station for serving each particular subscriber unit.

As shown at subscriber unit 26, some subscriber units may be "concentrated subscriber units" that support multiple subscriber terminals 38. A subscriber terminal may be thought of as a communications interface to communications system 20. For example, if concentrated subscriber unit 26 is a fixed wireless terminal, terminals 38 within concentrated subscriber unit 26 may provide a local loop telephone system interface for coupling to a telephone handset, such as telephone 40. Note that if telephones 40 are in the same vicinity, such as in the same building, subscriber terminals 38 may all share transceiver 46 in order to communicate with base station 36. Thus, in a concentrated subscriber unit, S number of subscriber terminals 38 may share transceiver resources provided by T number of transceivers, wherein S is greater than T. This sharing of transceiver resources reduces the cost and complexity of concentrated subscriber unit 26.

When communications system 20 grows to support a larger number of subscriber units, the communications system will need to add additional capacity to service those subscribers. Capacity may be added by increasing the number of transmission frequencies, or otherwise increasing the number of channels available to subscribers, wherein such channels and frequencies are used in various ways known in the art to separate data intended for one subscriber from another subscriber. In the example of communications system 20, base stations 34 and 36 each transmit on two carrier frequencies, illustrated at first carrier 42 and second carrier 44.

For the most part, subscriber terminals 38 appear to infrastructure 28 as separate subscriber units that can be tuned to separate frequencies and set to separate channels, like subscriber units 22 and 24. However, a problem exist with concentrated subscriber unit 26 when transceiver 46 is supporting subscriber terminals 38 that have been instructed to tune to different frequencies, such as first and second carriers 42 and 44. The problem occurs because transceiver 46 is typically designed to receive and transmit on a single carrier frequency. Thus, concentrated subscriber unit 26 works better when subscriber terminals 38 are instructed, as group, to select the same communication parameter, such as the same carrier frequency. By operating subscriber terminals 38 as a group, the benefits of sharing a transceiver 46 are maximized.

In communications system 20, subscriber units 22–26 and infrastructure 28 may agree upon a formula for selecting communications parameters, such as carrier frequency or other channel designation parameters. This formula for selecting communications parameters is used to reduce the number of messages transferred between infrastructure 28 and subscriber units 22–26, and to randomly distribute the selection of communication parameters so that capacity of the system is increased, and the success of accessing the communications system is increased. This random distribution attempts to spread subscriber units evenly among the carrier frequencies, for example.

In the prior art, communication parameters are selected by performing a hashing function on an identification number associated with the subscriber unit or subscriber terminal. For example, to select one of two carrier frequencies, both infrastructure 28 and subscriber unit 22 will input an ID number associated with subscriber unit 22 into a hashing function that hashes the ID number to produce a number indicating one of the two carrier frequencies that is being used to communicate between infrastructure 28 and subscriber unit 22. If four carrier frequencies are available, the hashing function outputs an indicator having one of four values so that one of four carrier frequencies may be selected.

Typically, the subscriber unit identification number is based on the telephone number associated with the subscriber unit. In concentrated subscriber unit 26, it is desirable to have a different phone number for each terminal unit 38. Furthermore, it may be desirable to have sequential phone numbers assigned to terminal units 38. The problem occurs in the prior art when the ID numbers for terminal units 38 hash, as a group, to more than one carrier frequency, or more carrier frequencies than transceiver 46 can support.

One solution to this problem, is described in U.S. Pat. No. 5,544,223, which shows a communications system that includes a database for recording which subscriber units are concentrated subscriber unit and which subscriber units are not. The disadvantages of this system include transmitting additional messages to indicate that a subscriber unit is a concentrated subscriber unit, and the recording, in a database, the subscriber unit status. This system requires additional overhead in messaging and data storage.

Thus, it should be apparent that a need exist for an improved method and system for selecting a communication parameter, such as a carrier frequency, for communicating with a concentrated subscriber unit in a communication system, wherein the number of overhead messages is reduced and a database indicating a concentrated subscriber unit is not required.

BRIEF SUMMARY OF THE INVENTION

Thus there is a particular need for a method and system for selecting a communication parameter, such as a carrier frequency, for communicating with a concentrated subscriber unit in a communication system, wherein the number of overhead messages is reduced and a database indicating a concentrated subscriber unit is not required. Briefly, in accordance with an embodiment of the present invention, a subscriber terminal identification number in one of multiple subscriber terminals is determined. Next, N number of selected digits in the subscriber terminal identification number are set equal to predetermined values to produce a modified subscriber terminal identification number. The modified subscriber terminal identification number is then hashed using a hashing function to produce a communication parameter indicator. The communication parameter is selected in response to the communication parameter indicator, wherein groups of subscriber terminal identification numbers having non-selected digits with the same value are hashed to produce the same communication parameter indicator.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 2:
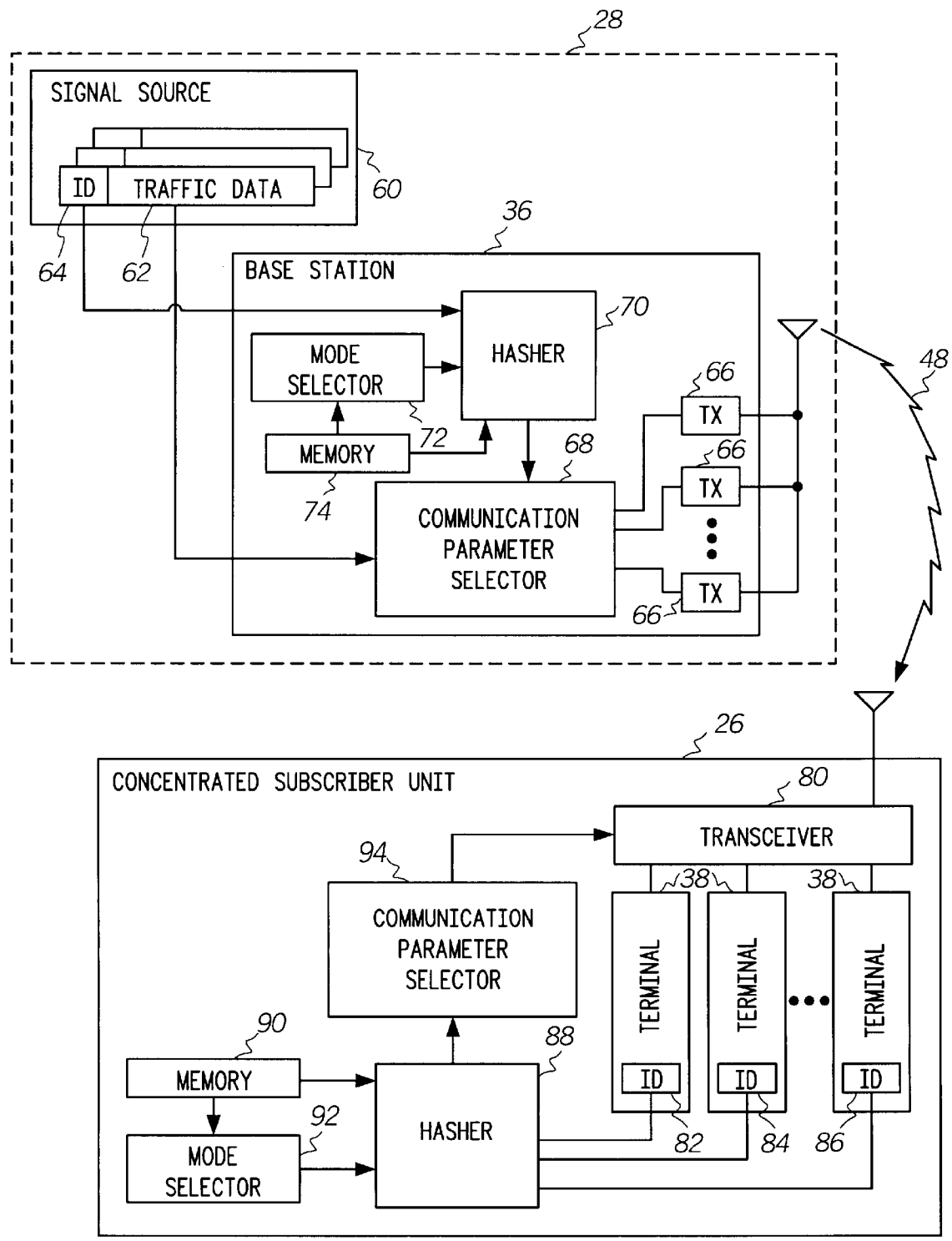
FIG. 2 is a high-level block diagram of a communications system that may be used to implement the method and system of the present invention.

With reference now to FIG. 2, there is depicted a high-level block diagram of a communications system that may be used to implement the method and system of the present invention. As is illustrated, infrastructure 28 communicates with concentrated subscriber unit 26 via communications channel 48. In the example shown in FIG. 2, communications channel 48 is a wireless communications channel. Communications channel 48 may be described by specifying a set of communication parameters, which may include a carrier frequency, a spreading code, a timeslot, an offset time, or other such communication parameters that are agreed upon between infrastructure 28 and concentrated subscriber unit 26 in order to establish a communications link. A preferred embodiment of channel 48 may be implemented according to a standard air interface, such as that described in Telecommunications Industry Association (TIA)/Electronics Industry Association (EIA)/Interim Standard (IS)–95, and similar air interfaces.

Within infrastructure 28, signal source 60 provides traffic and control signals to base station 36. Note that for simplicity base station controller 32 has not been shown within infrastructure 28.

Signal source 60 may provide multiple signal sources, each intended for a different subscriber unit, or for a specified subscriber unit supporting a main channel and sub-channels. In general, these signals include a portion containing traffic data 62 and a portion containing a subscriber terminal identification number, such as ID number 64. Signal source 60 does not necessarily provide packets having traffic data 62 and ID number 64 in each packet, but traffic data 62 is commonly associated with ID number 64 so that it may be routed to the proper subscriber unit or subscriber terminal. In a preferred embodiment, ID number 64 is based upon a telephone number of the subscriber unit.

Base station 36 is capable of transmitting on channels that may be specified by different communication parameters. For example, base station 36 may support two or more carrier frequencies, and multiple channels on each of the carrier frequencies. The channels may be defined by spreading codes, time slots, or other similar means in other multiple access schemes. In base station 36, a group of transmitters 66 is used to show that base station 36 may use multiple communication parameters to describer communication channel 48 with concentrated subscriber unit 26. In a preferred embodiment, transmitters 66 may each transmit on a different carrier frequency, and may transmit several channels on each frequency.

Also in base station 36 is communication parameter selector 68, which is used to select an appropriate communication parameter, such as carrier frequency, for transporting traffic data 62 via channel 48. Communication parameter selector 68 may be implemented in part with a multiplexer that routes traffic data 62 to the selected transmitter 66 operating on a selected frequency. In a more advanced application, communication parameter selector 68 may select a code channel, a timeslot, a transmit time offset, or other such communication parameter for the transmission of traffic data 62. As illustrated, communication parameter selector responds to a communication parameter indicator output by hasher 70.

Hasher 70 performs a hashing function that uses an input seed, such as ID number 64, and outputs a communication parameter indicator, within a specified range, in response to the seed value and other control parameters from mode selector 72 and memory 74.

Figure 1:
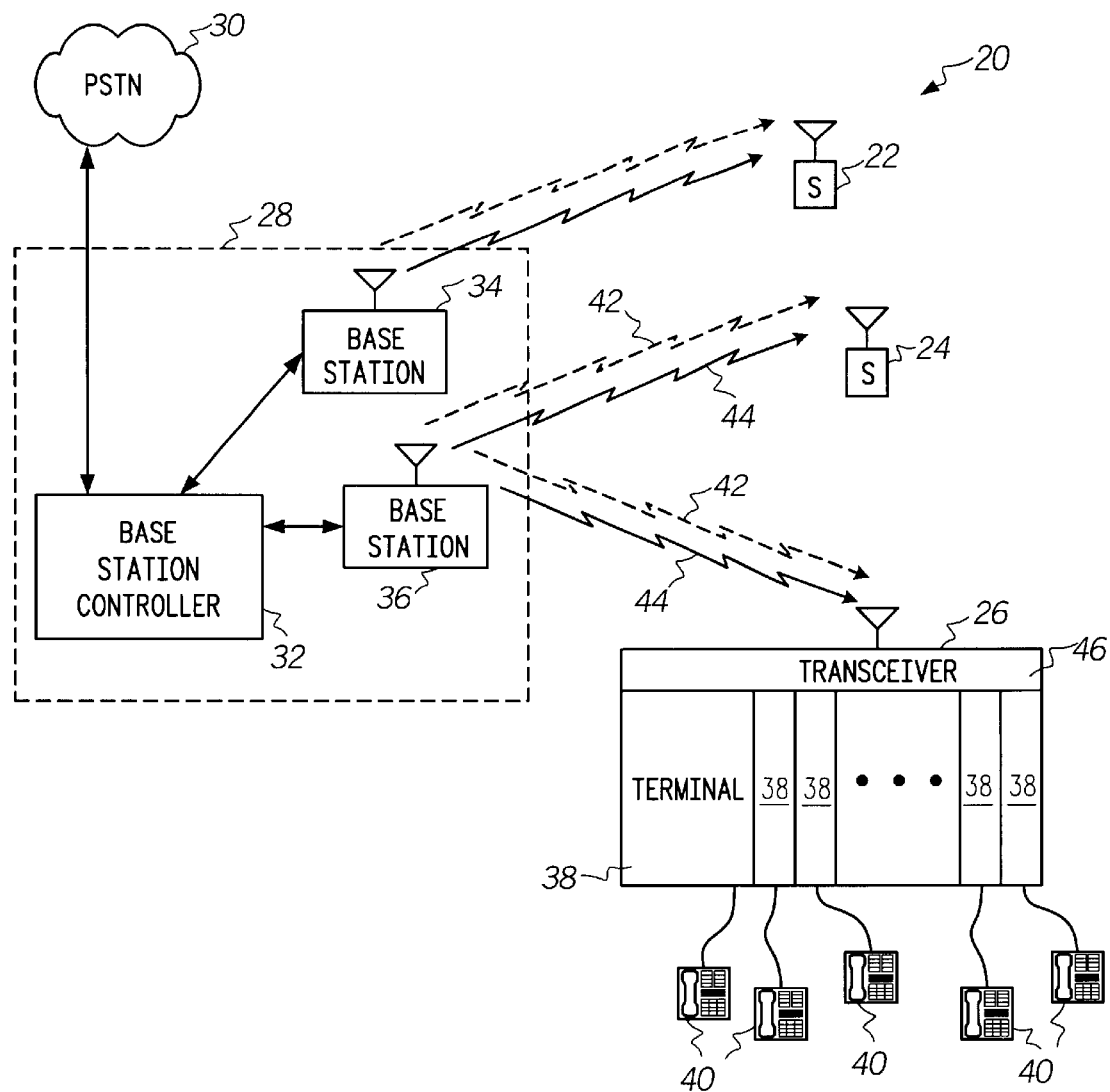
FIG. 1 is an overall diagram of a communications system having subscriber units and a concentrated subscriber unit.

According to an important aspect of the present invention, mode selector 72 selects either a group hashing mode or a distributed hashing mode, depending upon the function of the transmission for which the communication parameter is being selected. For example, to support concentrated subscriber units, a carrier frequency is preferably selected by hashing using a group hashing mode so that certain ID numbers 64 will hash to a predetermined communication parameter indicator, which enables a transceiver 46 to support multiple terminals 38 on the same carrier frequency (see FIG. 1). The communication parameters for other selected functions may preferably be selected by hasher 70 in a distributed hashing mode. These other functions may include a time offset, or paging slot number, for attempting to prevent message collisions to and from terminals 38 in concentrated subscriber unit 26. Thus, some communication parameters are best selected as a group based upon ID numbers 64 in concentrated subscriber unit 26, while other communication parameters are best selected in a distributed fashion so that subscriber terminals 38 in the same concentrated subscriber 26 unit do not all hash to the same communication parameter.

In support of these different hashing modes, mode selector 72 functions to select between the modes according to the current operating state of either infrastructure 28 or subscriber unit 26. Memory 74 stores parameters that may be set in hasher 70 to support the different modes that may be selected by mode selector 72. For example, mode selector 72 may be in a mode for selecting a carrier frequency, in which case memory 74 may recall the number of carrier frequencies available in the communication system. In another example, mode selector 72 may be set to a mode for selecting a spreading code for a paging channel, in which case memory 74 would recall the number of paging channels in use in the communication system.

Referring now to concentrated subscriber unit 26, a single transceiver 80 is shown for supporting multiple subscriber terminals 38. Transceiver 80 includes systems that may be shared for transmitting and receiving traffic data 62 via channel 48. These functions may include transmitting and receiving on specified carrier frequencies, decoding data having a particular spreading code or timeslot, radio frequency power amplification, and the like. Subscriber terminals 38 contain systems that are not easily shared, such as systems to modulate and demodulate traffic data 62 for a particular user's channel or sub-channel. In a preferred embodiment, subscriber terminals 38 each support a local loop interface for a telephone, which may be connected to concentrated subscriber unit 26. Note that each subscriber terminal 38 is associated with an ID number, such as ID numbers 82–86.

The other functional units in concentrated subscriber unit 26 perform similar functions to those corresponding units in base station 36. For example, hasher 88 performs a hashing function similar to hasher 70 in base station 36. Similarly, mode selector 92 and memory 90 provide inputs to hasher 88, in much the same way as mode selector 72 and memory 74. Hasher 88 also produces a communication parameter indicator, which is passed to communication parameter selector 94, which operates in manner similar to communication parameter selector 68. However, the output of communication parameter selector 94, in this example, controls a single transceiver, transceiver 80.

According to an important aspect of the present invention, ID numbers 82–86 and hasher 88 work together in a group hashing mode so that each ID number 82–86 hashes to the same communication parameter in the group hashing mode. In contrast, the distributed hashing mode uses ID numbers 82–86 produce an output from hasher 88 that distributes the selection of communication parameters among values in a permitted range.

Figure 3:
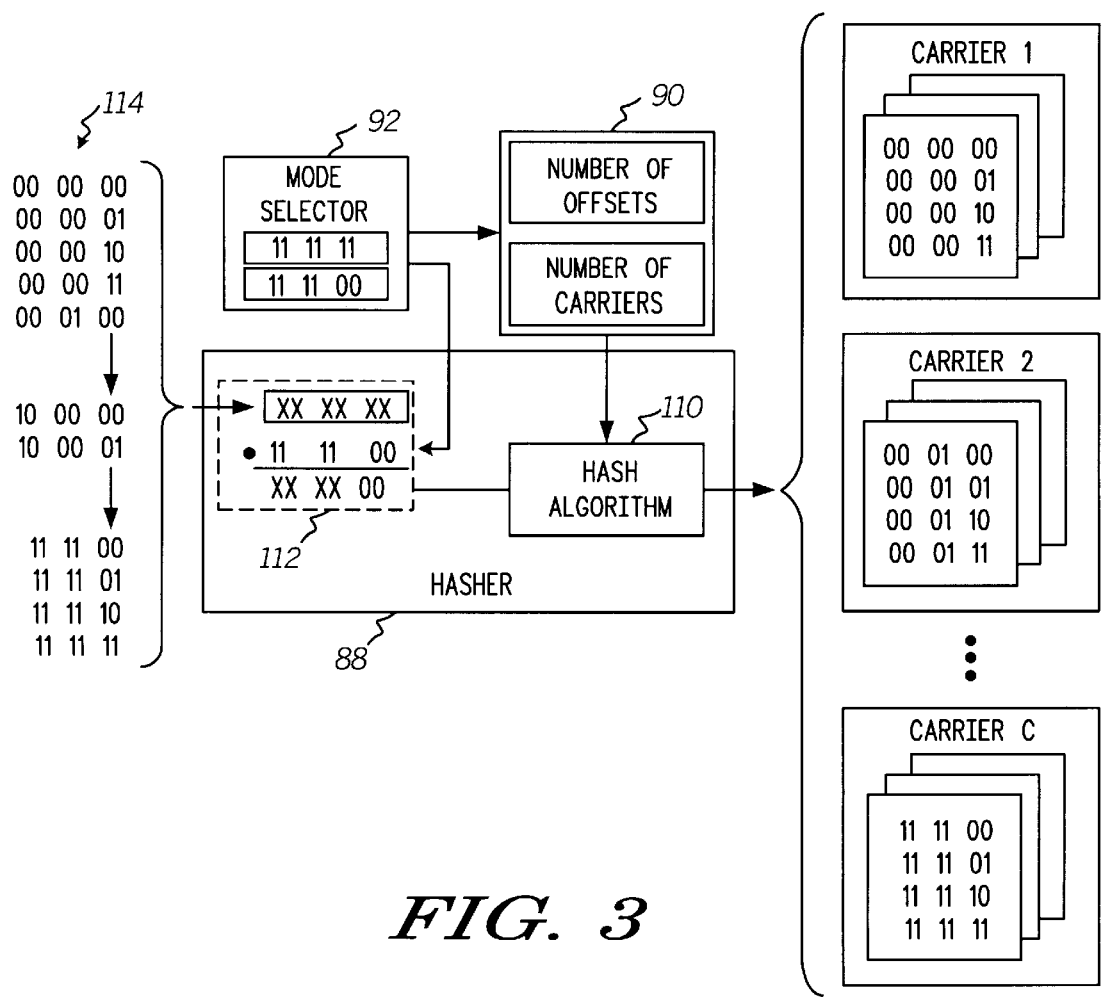
FIG. 3 is a block diagram showing further detail of the hasher function in accordance with the method and system of the present invention.

With reference now to FIG. 3, there is depicted a more detailed functional block diagram of the hashing function that may be used in both infrastructure 28 and concentrated subscriber unit 26 in accordance with the method and system of the present invention. As shown, hasher 88 is coupled to mode selector 92, which selects between a group hashing mode and a distributed hashing mode. Memory 90 is also coupled to hasher 88 for recalling and outputting data, such as the number of different outputs (i.e., the range) of hasher 88.

Hasher 88 contains hash algorithm 110 and identification number masker 112.

Hash algorithm 110 receives an input from ID number masker 112 and an input from memory 90 indicating the range, or number of permissible values of the hash function. The hash function outputs a number R based upon these inputs, and in accordance with a formula, such as the formula shown below:

$$R = \lfloor N \times ((40503 \times (L \oplus H \oplus \text{DECORR})) \bmod 2^{16})/2^{16} \rfloor$$

where HASH_KEY is derived from subscriber unit identification number 64, and H includes the most significant bits of HASH_KEY, and L includes the least significant bits of HASH_KEY.

This hashing algorithm is similar to the one specified in TIA/EIA Interim Standard (IS)-2000, which specifies a code division multiple access (CDMA) cellular telephone system. While this hashing function is specific to CDMA 2000, other hashing functions are possible.

ID number masker 112 receives a selected subscriber identification number from the set of subscriber identification numbers shown at reference numeral 114, and a mask value from mode selector 92. In a preferred embodiment, the subscriber ID number is based upon the telephone number of the subscriber unit that is a party to the communication. The mask value is based upon the hashing modes selected by mode selector 92. For example, in a group hashing mode, a mask value having selected bits set to 0 is used in order to set selected bits in the subscriber unit ID number to the predetermined value of 0 using a Boolean And function. This produces a modified subscriber unit identification number. Alternatively, in the distributing hashing mode, mode selector 92 will output a mask value having all bits set to 1, which does not modify the subscriber unit ID number.

As shown, the mask value output by mode selector 92 is used in ID number masker 112 to mask the subscriber unit ID number 114 and output that masked value to hash algorithm 110. Note that mode selector 92 may output various mask values for any number of hashing modes supported in the communications system. In a preferred embodiment, the least significant bits of subscriber unit ID number are masked, or set to a predetermined value, in the group hashing mode. This causes sequential ID numbers to hash to the same output value for groups of consecutive subscriber unit ID numbers. These groups include $2^N$ members, where n is the number of bits set to 0. These groups are illustrated in FIG. 3 at reference numeral 116 as groups of subscriber unit ID numbers that hash to communication parameter indicators indicating carrier 1 through carrier C, in a communications system having C number of carriers.

Figure 4:
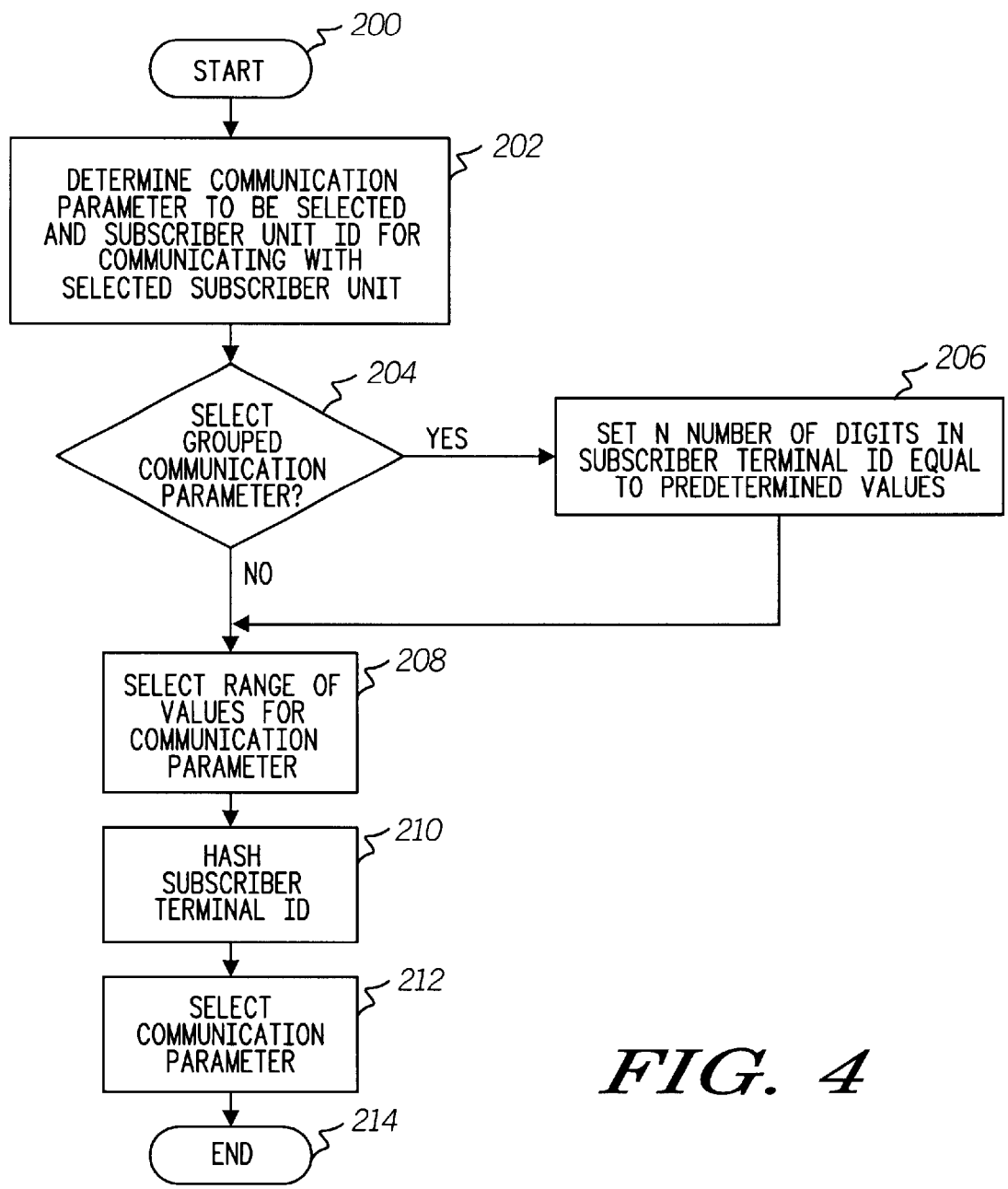
FIG. 4 is a high-level logical flowchart that illustrates the steps of selecting a communication parameter for communicating with a concentrated subscriber unit in accordance with the method and system of the present invention.

With reference now to FIG. 4, there is depicted a high-level block diagram of a method for selecting a communication parameter for communicating with a concentrated subscriber unit in accordance with the method and system of the present invention. As illustrated, the process begins at block 200 and thereafter passes to block 202 wherein the process determines what kind of communication parameter will be selected. Communication parameters that may be selected include a carrier frequency, a Walsh code, a timeslot, a time offset, and the like.

Next, the process determines whether or not the parameter being selected is a "grouped" communication parameter, as illustrated at block 204. If the parameter is a grouped communication parameter, the process sets N number of digits in the subscriber terminal ID equal to predetermined values, as depicted at block 206. The number N is chosen so that the number of members of a group having the same communication parameter indicator from the hashing function equals $2^N$. In a preferred embodiment, the process sets N number of least significant digits in the subscriber terminal ID equal to 0. This permits a group of N sequentially numbered subscriber terminal IDs to hash to the same communication parameter indicator.

Following block 206, and block 204 when answered in the negative, the process selects a range of values for the communication parameter indicator, as illustrated at block 208. This range of values is equal to the number of settings permitted for the kind of communication parameter to be selected. For example, if carrier frequency is to be selected, the range of values equals the number of carrier frequencies used in the communication system. A different range of values may be used when selecting from a different number of paging channels in a system, where the number of paging channels does not equal the number of carrier frequencies. Thus, the range of values is determined by the particular kind of communication parameter to be selected. Typically this range of values is recalled from a register or memory.

Next, the process hashes the subscriber terminal identification number, as depicted at block 210, and as discussed above with reference to hash algorithm 110. Note that the input for this hash function may be a subscriber unit ID number determined at block 202, or a modified subscriber terminal identification number modified at the step shown at block 206. The output of the hash function is a communication parameter indicator.

Next, the process selects a communication parameter in response to the communication parameter indicator, as illustrated at block 212. In a preferred embodiment, the selection of a communication parameter in a group mode may include the selection of a carrier frequencies for subscriber terminals in a concentrated subscriber unit. Selection of a communication parameter in a distributed mode may include the selection of an offset time used by subscriber terminals in a concentrated subscriber unit to determine a time for accessing the communication system, which prevents all or many of the subscriber terminals from trying to access the system at the same offset time.

Finally, the process for selecting a communication parameter terminates as shown at block 214.

Note that the process depicted in FIG. 4 may be performed in infrastructure 28 or concentrated subscriber unit 26. The method and system of the present invention have the advantage of being able to select a common, or same-valued, communication parameter for each terminal unit 38 in concentrated subscriber unit 26 when it is important that such a communication parameter be the same for all terminal units. Additionally, when it is important that the communication parameter selected not be the same among terminal units 38 in concentrated subscriber unit 26, the present method and system provides a distributed communication parameter selected mode. Thus, the communication parameter selection modes of the present invention permit common parameter selection for shared resources, and distributed parameter selection when such resources should not be shared at the same time.

In some embodiments of the present invention, a number of bits may be appended to the extended system parameters message, which is defined in IS 2000, to specify a number of least significant bits that will be set to 0 by ID number masker 112. This message is a broadcast message, which need not be individually transmitted through each subscriber unit like a mobile station directed message. In a preferred embodiment, three bits may be used in order to specify from 0 to 7 bits that may be set to a predetermined value.

Another advantage of the present invention over the prior art is that the present invention does not require a database that records or identifies the concentrated subscriber units in the communication system in order to treat them differently when instructions are sent for changing carrier frequencies or paging channels. In the present invention, if, say, the least significant five bits in the subscriber unit ID number are masked to 0, consecutive subscriber unit ID numbers may hash into groups each containing 32 subscriber ID numbers. Using this system, a concentrated subscriber unit may be built with 32 subscriber terminals, each numbered sequentially so that the hashing function will select the same carrier frequency for all 32 subscriber terminals. If a concentrated subscriber unit in the same system is designed with 16 subscriber terminals, the remaining 16 subscriber unit identification numbers in the group of 32 may be assigned to subscriber units supporting a single channel, such as subscriber units 22 and 24 in FIG. 1. It is not important to the system whether the subscriber unit has a single channel, or whether it is a member of a concentrated subscriber unit having multiple channels sharing a communication resource.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a transceiver for selecting a communication parameter for communicating with a concentrated subscriber unit, wherein the concentrated subscriber unit includes a plurality of subscriber terminals, the method comprising the steps of:

determining a subscriber terminal identification number of one of the subscriber terminals;

setting N number of selected digits in the subscriber terminal identification number equal to predetermined values to produce a modified subscriber terminal identification number;

hashing the modified subscriber terminal identification number using a hashing function to produce a communication parameter indicator; and selecting the communication parameter in response to the communication parameter indicator, wherein groups of subscriber terminal identification numbers having non-selected digits with the same value are hashed to produce the same communication parameter indicator.

2. The method for selecting a communication parameter according to claim 1 further including steps of:

hashing the subscriber terminal identification number using the hashing function to produce a second selected communication parameter indicator; and selecting a second communication parameter in response to the second selected communication parameter indicator, wherein groups of subscriber terminal identification numbers having non-selected digits with the same value are hashed to produce the same communication parameter indicator and a distributed second selected communication parameter indicator.

3. The method for selecting a communication parameter according to claim 1 wherein the step of determining a subscriber terminal identification number of one of the subscriber terminals further includes reading a subscriber terminal identification number from a register in one of the subscriber terminals.

4. The method for selecting a communication parameter according to claim 1 wherein the step of determining a subscriber terminal identification number of one of the subscriber terminals further includes determining a subscriber terminal identification number from a message associated with one of the subscriber terminals in the concentrated subscriber unit.

5. The method for selecting a communication parameter according to claim 1 wherein the selected communication parameter is a carrier frequency designator.

6. The method for selecting a communication parameter according to claim 1 wherein the second selected communication parameter is an access channel time offset.

7. A system in a transceiver for selecting a communication parameter for communicating with a concentrated subscriber unit, wherein the concentrated subscriber unit includes a plurality of subscriber terminals, the system comprising:

means for determining a subscriber terminal identification number of one of the subscriber terminals;

means for setting N number of selected digits in the subscriber terminal identification number equal to predetermined values to produce a modified subscriber terminal identification number;

means for hashing the modified subscriber terminal identification number using a hashing function to produce a communication parameter indicator; and means for selecting the communication parameter in response to the communication parameter indicator, wherein groups of subscriber terminal identification numbers having non-selected digits with the same value are hashed to produce the same communication parameter indicator.

8. The system for selecting a communication parameter according to claim 7 further including:

means for hashing the subscriber terminal identification number using the hashing function to produce a second selected communication parameter indicator; and means for selecting a second communication parameter in response to the second selected communication parameter indicator, wherein groups of subscriber terminal identification numbers having non-selected digits with the same value are hashed to produce the same communication parameter indicator and a distributed second selected communication parameter indicator.

9. The system for selecting a communication parameter according to claim 7 wherein the means for determining a subscriber terminal identification number of one of the subscriber terminals further includes means for reading a subscriber terminal identification number from a register in one of the subscriber terminals.

10. The system for selecting a communication parameter according to claim 7 wherein the means for determining a subscriber terminal identification number of one of the subscriber terminals further includes means for determining a subscriber terminal identification number from a message associated with one of the subscriber terminals in the concentrated subscriber unit.

11. The system for selecting a communication parameter according to claim 7 wherein the selected communication parameter is a carrier frequency designator.

12. The system for selecting a communication parameter according to claim 7 wherein the second selected communication parameter is an access channel time offset.

* * * * *